United States Patent [19]

Huetsch et al.

[11] 4,223,766
[45] Sep. 23, 1980

[54] TRAILER HITCH AND BRAKE ACTUATING ASSEMBLY

[75] Inventors: Larry C. Huetsch, Rockford; James P. Swanson, Winnebago; Stephen E. Nyquist, Cherry Valley, all of Ill.

[73] Assignee: Atwood Vacuum Machine Company, Rockford, Ill.

[21] Appl. No.: 910,100

[22] Filed: May 30, 1978

[51] Int. Cl.² ............................................... B60T 7/20
[52] U.S. Cl. ................................................ 188/112 R
[58] Field of Search .................... 188/3 R, 3 H, 65.1, 188/112; 280/446 R; 60/592

[56] References Cited

U.S. PATENT DOCUMENTS

| 1,482,268 | 1/1924 | Schopper | 188/65.1 |
|---|---|---|---|
| 2,135,097 | 11/1938 | Billingsley | 188/112 |
| 2,341,965 | 2/1944 | Wagner | 188/112 |
| 2,729,309 | 1/1956 | Mullin | 188/112 |
| 2,922,623 | 1/1960 | Simmons | 188/65.1 |
| 2,956,648 | 10/1960 | McDaniel | 188/112 |
| 2,960,194 | 11/1960 | Stromberg | 188/112 |
| 3,175,649 | 3/1965 | Kirk et al. | 188/112 |
| 3,180,454 | 4/1965 | Angelis et al. | 188/112 |
| 3,448,834 | 6/1969 | Lammers | 188/112 |
| 3,567,253 | 3/1971 | De Puydt et al. | 280/512 |
| 3,880,263 | 4/1975 | Ewald et al. | 188/112 |

*Primary Examiner*—Edward R. Kazenske
*Attorney, Agent, or Firm*—Leydig, Voit, Osann, Mayer & Holt, Ltd.

[57] ABSTRACT

A trailer is adapted to be hitched to a towing vehicle by a surge brake actuator which includes pivotally interconnected forward and rear units. When the rear unit moves forwardly relative to the forward unit, a plunger assembly is moved to a braking position to actuate a master cylinder and apply the trailer brakes. The disclosure pertains to (1) the construction and operation of the plunger assembly (2) the construction and mounting of the master cylinder (3) a friction lock for holding a breakaway cable in an emergency position when the trailer breaks away from the towing vehicle and (4) a clamping and latching mechanism for releasably coupling the forward unit of the actuator to a hitch ball on the towing vehicle.

7 Claims, 11 Drawing Figures fig. 1.

TRAILER HITCH AND BRAKE ACTUATING ASSEMBLY

BACKGROUND OF THE INVENTION

This invention relates to an assembly for hitching a trailer to a towing vehicle and for automatically actuating the hydraulic brakes of the trailer when the towing vehicle slows and the trailer tends to surge forward and overrun the towing vehicle. More particularly, the invention relates to an assembly having a forward unit which is adapted to be coupled removably to a hitch ball on the towing vehicle and which is pivotally interconnected with a rear unit adapted to be carried on the trailer. When the trailer surges forwardly, the rear unit moves forwardly relative to the forward unit and pivots relative to the forward unit about a laterally extending axis to cause a member on the forward unit to actuate a master cylinder on the rear unit. Upon being actuated, the master cylinder pressurizes the wheel cylinders of the trailer to apply the trailer brakes.

An assembly of the foregoing type is commonly referred to as a surge brake actuator. An actuator whose forward and rear units are pivotally interconnected in the manner described above possesses several advantages over actuators having telescoping units or having units which are interconnected by parallel links. For example, a surge brake actuator with pivotally interconnected units generally achieves a higher gain or mechanical advantage. Also, such an actuator generally is shorter in length, lighter in weight and more economical to manufacture than actuators with telescoping or parallel linked units.

SUMMARY OF THE INVENTION

The general aim of the present invention is to provide a new and improved surge brake actuator which preferably has pivotally interconnected units and which, when compared with prior actuators, enables higher braking pressures and a smoother braking action to be produced, offers more reliable breakaway protection and provides a self-locking and more easy to use coupler for hitching the actuator to the towing vehicle.

A more detailed object of the invention is to provide an actuator in which a uniquely caged and preloaded coil spring of relatively short length serves as a cushion to produce a smooth braking action.

Another object is to actuate the master cylinder under a breakaway condition by means of a flexible cable which is pulled to an emergency position when a breakaway occurs, the cable thereafter being held in its emergency position by a novel friction lock which enables the cable to be effectively pulled to its emergency position regardless of the angular relation which exists between the trailer and the towing vehicle at the time of breakaway.

A further object is to provide an actuator having a front unit with a unique ball coupler which may be locked and released in a safe and convenient manner by means of a manually operable handle on the rear unit while still enabling the rear unit to pivot and float relative to the front unit during surge braking.

The invention also resides in the simple and inexpensive construction of the master cylinder and in the unique manner of mounting the master cylinder in the rear unit.

These and other objects and advantages of the invention will become more apparent from the following detailed description when taken in conjunction with the accompanying drawings.

DETAILED DESCRIPTION OF THE PREFERRED EMBODIMENT

As shown in the drawings for purposes of illustration, the invention is embodied in a surge brake actuator assembly 10 for hitching a trailer 11 to a towing vehicle 12 and for automatically applying the hydraulic brakes of the trailer when the trailer surges forward and attempts to overrun the towing vehicle. The actuator is carried on the forward end portion of the tongue 14 of the trailer and is adapted to be coupled releasably to a standard hitch ball 15 on the rear of the towing vehicle.

In the present instance, the actuator 10 includes a forward coupling unit 16 (see FIG. 9) adapted to receive the hitch ball 15 and pivotally interconnected with a rear unit 17 which is secured to the tongue 14 of the trailer 11. The forward coupling unit includes a head 18 made of heavy gage sheet metal and formed on its lower, forward end with a downwardly and rearwardly opening socket 20 for receiving the hitch ball 15. Formed integrally with and projecting upwardly from the socket is a web 21 whose upper end is defined by a rearwardly and downwardly turned curl 22 which is located above the socket and slightly rearwardly of the vertical center line of the socket. The head is completed by two laterally spaced wings 24 which project rearwardly from the socket and the web.

The rear unit 17 includes a sheet metal case 25 (FIG. 9) of inverted U-shaped cross-section and formed with a top wall 26 and two laterally spaced side walls 27. The tongue 14 of the trailer 11 is received between the side walls 27 adjacent the lower portions thereof and is suitably fastened to the side walls by bolts 28 (FIG. 3) or the like. In addition, the forward portions of the side walls receive and embrace the wings 24 of the forward coupling unit 16.

Advantageously, the forward coupling unit 16 is pivotally interconnected with the rear unit 17 so as to enable the two units to float or pivot relative to one another about a laterally extending axis when the trailer 11 surges forwardly. For this purpose, a pivot pin 30 (FIGS. 3 and 9) is inserted through the curl 22 of the forward unit 16 and through holes 31 in the forward end portions of the side walls 27 and is suitably staked in place. A second pin in the form of a laterally extending rod or bolt 32 extends through holes 34 in the lower, rear portions of the wings 24 and is received within upwardly and rearwardly curved arcuate slots 35 in the side walls 27. The stepped diameter bolt 32, commonly called a shoulder bolt, includes a collar 36 (FIGS. 5 and 9) which travels freely in one of the arcuate slots, the bolt supporting a bushing 37 which rides in the other slot. The shoulder bolt is captivated axially by a nut 38.

Figure 1:
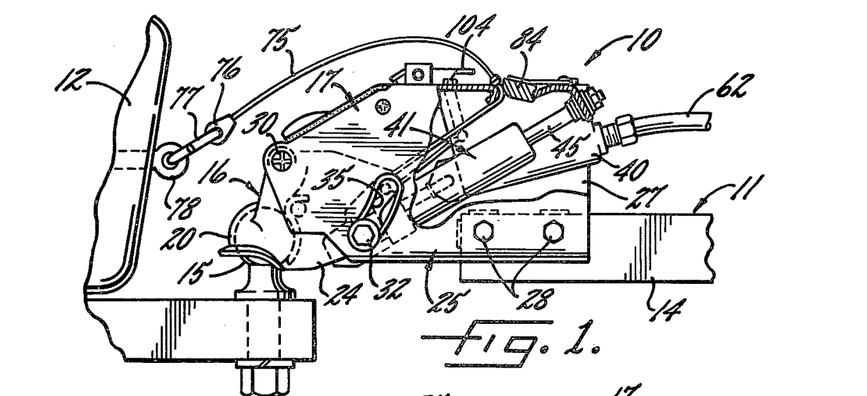
FIG. 1 is a fragmentary side elevational view of a new and improved surge brake actuator incorporating the unique features of the present invention, the actuator being shown connected between a towing vehicle and a trailer and being shown in a non-braking condition.
Figure 2:
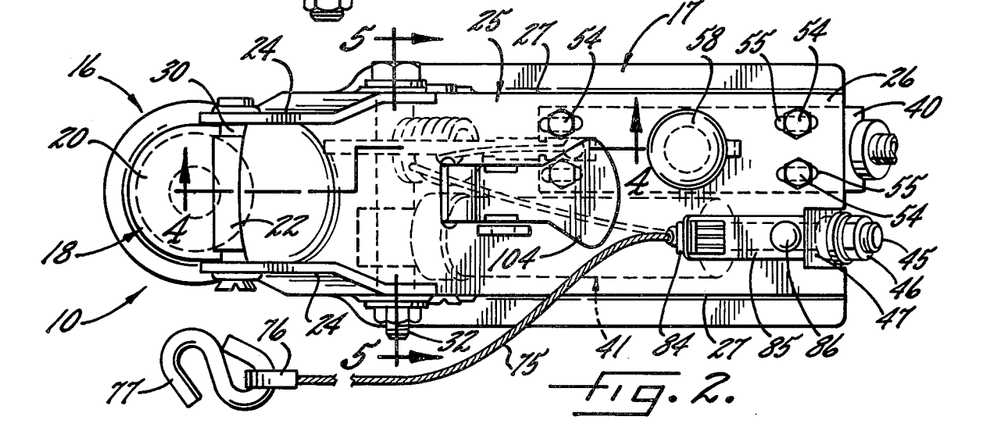
FIG. 2 is an enlarged top plan view of the actuator shown in FIG. 1.

If the towing conditions are such that the trailer 11 is imposing a drag on the towing vehicle 12, the forward and rear units 16 and 17 of the actuator 10 assume the relative positions shown in FIG. 1. When the units are so positioned, the pivot pin 30 is located above the hitch ball 15 and just slightly to the rear of the vertical centerline of the ball while the shoulder bolt 32 is located at the extreme lower ends of the arcuate slots 35. When the trailer surges forward as a result of the towing vehicle traveling slower than the trailer, the forward and rear units 16 and 17 move relative to one another to the position shown in FIGS. 3 and 4. In assuming such position, the rear unit 17 moves forwardly and acts through the pivot pin 30 to cause the forward unit 16 to rotate counterclockwise or forwardly about the hitch ball 15 so as to bring the pivot pin forwardly to a position in which it is approximately centered on the vertical centerline of the hitch ball. At the same time, the forward unit 16 pivots counterclockwise relative to the rear unit 17 about the pivot pin 30 so as to cause the shoulder bolt 32 to travel upwardly and rearwardly within the arcuate slots 35. The upward and rearward movement of the shoulder bolt 32 is utilized to actuate a master cylinder 40 (FIGS. 4 and 9) and apply the brakes of the trailer 11.

To dampen oscillation between the forward and rear units 16 and 17, a shock absorber 41 (FIGS. 1, 5 and 9) is disposed between the side walls 27 of the case 25 and includes a cylinder 42 with a sleeve 44 on its forward end, the sleeve receiving the shoulder bolt 32. A piston (not shown) is telescoped slidably into the cylinder and is connected to a rod 45 (FIG. 3) whose rear end portion is secured by a nut 46 to a tab 47 turned downwardly from the rear end of the top wall 26 of the case 25. The shock absorber 41 acts between the shoulder bolt 32 and the case 25 to dampen movement of the shoulder bolt within the slots 35. If, for example, the trailer 11 is traveling over a rough road, the forward and rear units 16 and 17 will tend to repeatedly pivot with respect to one another with oscillatory movement of relatively low amplitude and relatively high frequency. The shock absorber 41, however, resists such movement and prevents the shoulder bolt from effecting intermittent application of the trailer brakes. Also, when the brakes of the trailer are applied, there is a tendency for the trailer to overbrake and then underbrake in a cyclic manner. The shock absorber serves to dampen the inertia of the trailer and thus acts to smooth out oscillation or jerky motion between the trailer and the towing vehicle 12.

Figure 6:
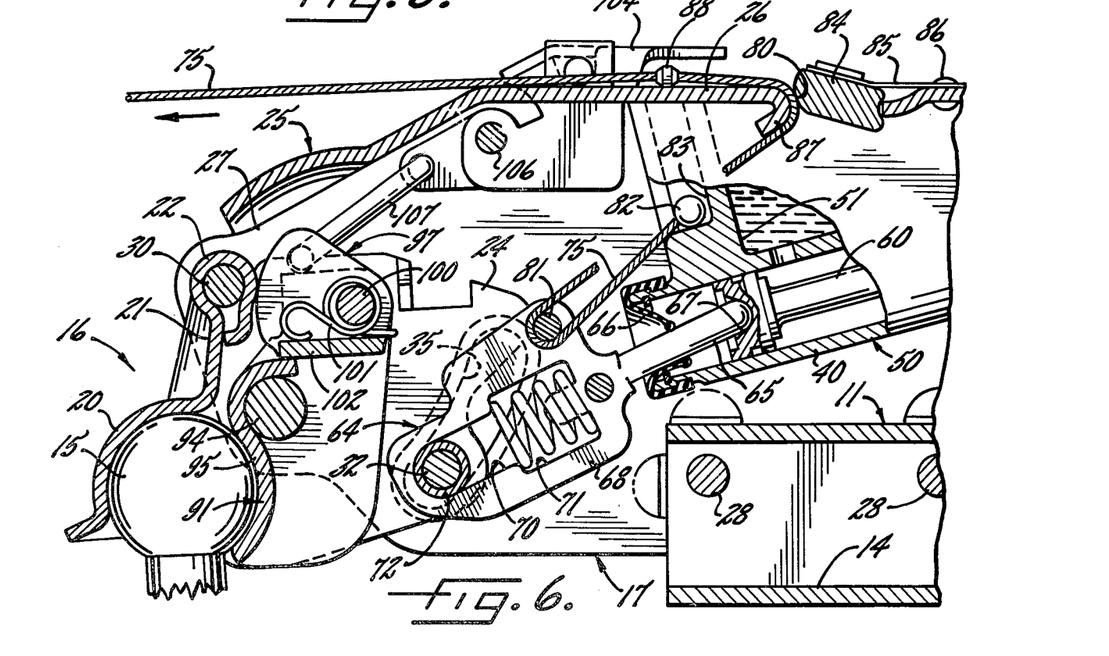
FIG. 6 is a view similar to FIG. 4 but shows the actuator in an emergency, breakaway braking condition.
Figure 9:
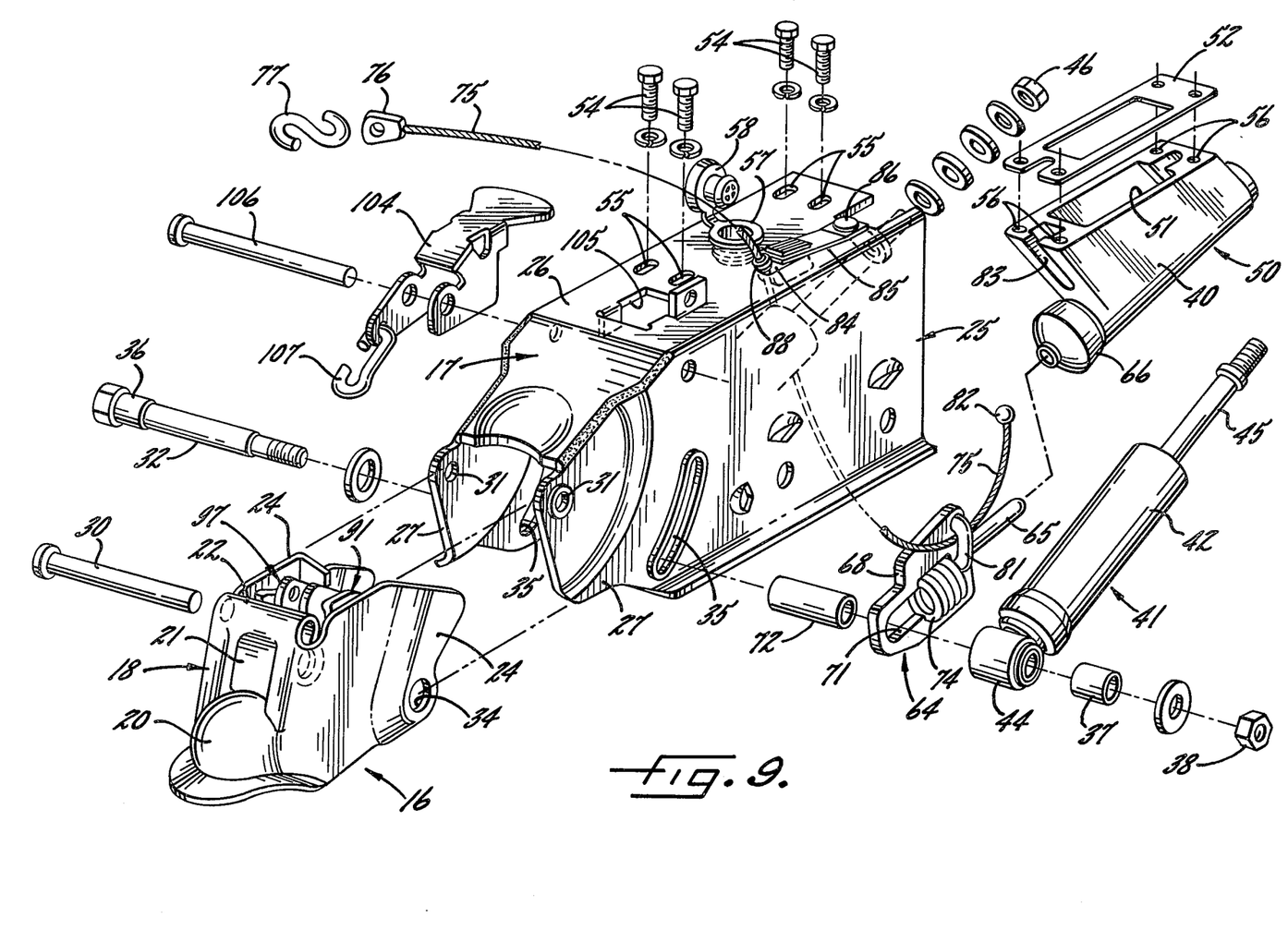
FIG. 9 is an exploded perspective view of the actuator.

The master cylinder 40 forms part of a master cylinder assembly 50 which is mounted within the rear portion of the case 25. Herein, the master cylinder assembly 50 includes a casting whose lower end portion defines the master cylinder 40 and whose upper end portion defines a reservoir 51 (FIG. 6) for brake fluid. In keeping with one of the features of the invention, the cost of manufacturing the master cylinder assembly 50 is reduced along with the weight of the assembly by casting the assembly such that the top of the reservoir 51 is left open and by closing off the top of the reservoir with the top wall 26 of the case 25 itself. Thus, the open top of the reservoir 51 is located immediately below the top wall 26 of the case 25 and is sealed to the top wall by means of a gasket 52 (FIG. 9). Four screws 54 extend through holes 55 in the top wall 26 and are threaded into holes 56 in the master cylinder assembly to secure the latter to the top wall. A rubber fill spout 57 for brake fluid is fitted into an opening in the top wall, communicates with the reservoir 51 and is adapted to be closed by a hinged plug 58.

It will be noted that the master cylinder 40 is inclined upwardly and rearwardly within the case 25. As a result, room exists beneath the cylinder for the tongue 14 of the trailer 11 and thus the overall length of the actuator 10 may be shortened.

Disposed in the master cylinder 40 is a piston 60 (FIG. 4) which is adapted to be stroked rearwardly (or from left to right in FIG. 4) to apply the brakes of the trailer 11, there being a coiled compression spring 61 preloaded in the cylinder to assist in returning the piston in the reverse direction. When the piston is stroked rearwardly, brake fluid is pressurized in a flexible line 62 (FIG. 1) which extends out of the rear of the master cylinder and which leads to the wheel cylinders of the trailer. The wheel cylinders thus are actuated to apply the brakes of the trailer.

In accordance with an important aspect of the present invention, a unique plunger assembly 64 (FIG. 4) is interposed between the shoulder bolt 32 of the forward coupling unit 16 and the piston 60 of the master cylinder assembly 50 for stroking the piston in response to upward and rearward movement of the shoulder bolt when the trailer 11 overruns the towing vehicle 12. The plunger assembly is characterized by its ability to serve as a cushion to produce a smooth braking action.

Figures 4, 5:
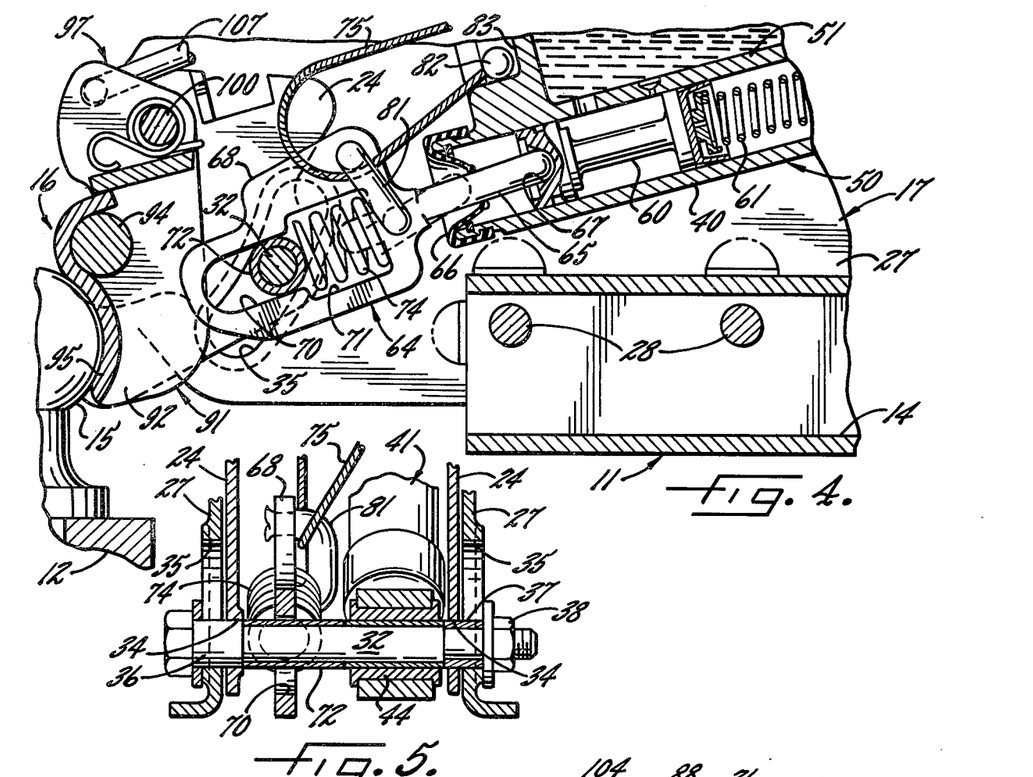
FIG. 4 is an enlarged fragmentary cross-section taken substantially along the line 4—4 of FIG. 2 and shows the actuator in a normal braking condition.
FIG. 5 is an enlarged fragmentary cross-section taken substantially along the line 5—5 of FIG. 2.

More specifically, the plunger assembly 64 includes a rear portion defined by a stem 65 which is telescoped slidably through a flexible boot 66 on the forward end of the master cylinder 40, the rear end of the stem being disposed in engagement with a rounded socket 67 in the forward end of the piston 60. A plate 68 is integral with the forward end of the stem 65 and is formed with an opening which is substantially T-shaped in that the opening includes a stem portion defined by a relatively narrow slot 70 in the forward portion of the plate and further includes a cross bar portion defined by a wider hole 71 through the rear portion of the plate. The shoulder bolt 32 is telescoped into a bushing 72 which is received within the slot 70 in the plate 68. The length of the slot is about twice as large as the diameter of the bushing.

In carrying out the invention, a relatively short and heavy coil spring 74 (FIG. 4) is caged in a preloaded condition in the hole 71 in the plate 68 of the plunger assembly 64. The spring is placed in the cage or hole 71 with its forward end bearing against the forward side of the hole and with its rear end bearing against the rear side of the hole. The spring is compressed prior to being placed in the hole and is under a high initial preload. Because of the high preload, the spring 74 is assembled with the plate 68 of the plunger assembly 64 prior to the time the plunger assembly and the master cylinder assembly 50 are installed in the case 25.

Once the master cylinder assembly 50 and the plunger assembly 64 are installed, the shoulder bolt 32 is assembled with the front and rear units 16 and 17 and is inserted through the slot 70 in the plate 68 of the plunger assembly. It is desirable that the forward end of the spring 74 be in contact with the shoulder bolt 32 when the forward and rear units 16 and 17 are in their normal, unactuated positions shown in FIG. 1. To permit such contact to be established, the master cylinder assembly 50 is mounted in the case 25 so as to be capable of fore-and-aft adjustment. This is accomplished by making the holes 55 (FIG. 9) in the top wall 26 of the case 25 in the form of elongated slots. By virtue of the slots 55, the master cylinder assembly 50 may be slid forwardly in the case 25 until the forward end of the spring 74 contacts the shoulder bolt 32 when the latter is located in the lower ends of the arcuate slots 35. The screws 54 then may be tightened to anchor the master cylinder assembly in place. The master cylinder assembly is adjusted forwardly only by such distance as to take up the clearance between the forward end of the spring 74 and the shoulder bolt 32 without causing the plunger assembly 64 to actuate the piston 60 of the master cylinder 40. Proper adjustment of the master cylinder assembly 50 may be effected by sliding the assembly forwardly until the piston 60 is actuated by the plunger assembly 64, by releasing the master cylinder assembly to allow the return spring 61 to shift the master cylinder assembly rearwardly until the piston is in an unactuated position and then by tightening the screws 54.

In operation, the shoulder bolt 32 remains in the bottom of the arcuate slots 35 as long as the trailer 11 is exerting a drag on the towing vehicle 12. If the trailer is traveling over a rough road, the shoulder bolt may tend to travel upwardly in the slots 35 through a short distance. Movement of the shoulder bolt is dampened by the shock absorber 41 and is cushioned by the spring 74 and thus actuation of the trailer brakes will not be effected if a relatively small force of only short duration is exerted on the shoulder bolt.

When the trailer 11 overruns the towing vehicle 12, the forward unit 16 pivots forwardly to cause the shoulder bolt 32 to travel upwardly in the arcuate slots 35 and push against the preloaded coil spring 74. The latter initially acts as a rigid link between the shoulder bolt and the rear side of the hole 71 and thus serves to shift the plunger assembly 64 rearwardly to a braking position (see FIG. 4) so as to move the piston 60 rearwardly through its actuating stroke. The master cylinder 40 thus is pressurized to apply the brakes of the trailer. When the pressure in the master cylinder exceeds the preload in the spring 74, the latter yields and compresses to enable continued rearward movement of the shoulder bolt 32 without substantially increasing the pressure in the master cylinder. Accordingly, the spring 74 serves as a cushion for the shoulder bolt so as to effect a smooth application of the master cylinder and the brakes.

The invention also contemplates the provision of unique means for actuating the brakes of the trailer 11 and for keeping the brakes actuated in the event the trailer breaks away from the towing vehicle 12. The breakaway protection means are characterized by the fact that, upon breakaway, the trailer brakes will be actuated and held in an actuated position regardless of the angular position of the trailer relative to the towing vehicle at the time of breakaway. Moreover, the shoulder bolt 32 is bypassed upon breakaway and thus direct and immediate actuation of the trailer brakes may be effected.

Herein, breakaway protection is afforded by a flexible cable 75 (FIG. 1) whose forward end carries an eye 76 which is connected to an S-shaped hook 77. The S-hook is adapted to be connected to an eye bolt 78 or the like on the rear end of the towing vehicle 12.

In keeping with the invention, the cable 75 is threaded downwardly through an opening 80 (FIG. 6) in the top wall 26 of the case 25, is looped through a U-shaped shackle 81 (FIG. 4) which is secured to the plate 68 of the plunger assembly 64, and is anchored at its rear end to the master cylinder assembly 50. Anchoring of the cable is effected by means of a ball 82 secured to the cable and fitted within a T-shaped slot 83 in the forward end of the master cylinder assembly 50.

If the trailer 11 should happen to break away from the towing vehicle 12, as, for example, might occur if the hitch ball 15 should fracture, a forward pull will be exerted on the forward end of the cable 75 and will continue until the S-hook 77 bends and separates either from the cable or from the eye bolt 78. When the cable is pulled forwardly to its emergency position, the cable pulls rearwardly on the shackle 81 and forces the plunger assembly 64 rearwardly (see FIG. 6). The plunger assembly actuates the piston 60 and applies the brakes of the trailer. Because of the elongated slot 70 in the plate 68, the cable may move the plunger assembly 64 rearwardly without moving the shoulder bolt 32. In other words, the slot 70 constitutes a lost motion connection between the plunger assembly and the shoulder bolt and allows the cable to move the plunger assembly rearwardly without need of moving the shoulder bolt and effecting relative pivoting between the front and rear units 16 and 17. Thus, the emergency braking action effected by the cable 75 is immediate and direct.

Importantly, the breakaway cable 75 is held in its emergency position by a friction lock 84 (FIG. 6) which enables the cable to be pulled to its emergency position even if the trailer 11 is at a sharp angle relative to the towing vehicle 12 when the breakaway occurs. In the present instance, the friction lock 84 comprises a metal shoe which is carried on the forward end of a leaf spring 85 whose rear end is secured cantilever fashion at 86 to the top wall 26 of the case 25 at a point rearwardly of the opening 80. The spring 85 urges the shoe 84 downwardly into the opening 80 and causes the shoe to press the cable 75 against a downwardly and forwardly curved lip 87 which defines the forward side of the opening.

When the cable 76 is pulled forwardly to its emergency position, the shoe 84 is moved upwardly against the bias of the spring 85 and allows relatively free forward movement of the cable. Forward movement of the cable continues until the S-hook 77 bends and releases the cable from the towing vehicle 12. The return spring 61 of the master cylinder assembly 50 attempts to pull the cable reversely to release the trailer brakes but such movement is prevented by the shoe 84. When the cable attempts to move rearwardly, it exerts a downwardly and rearwardly directed frictional force on the shoe 84. Such force acts along with the force in the leaf spring 85 to wedge the shoe downwardly into the opening 80 and to cause the shoe to press the cable against the lip 87 at the forward side of the opening. The cable thus is held in its emergency position and holds the plunger assembly 64 in its braking position. Because of the frictional engagement of the shoe with the cable, the latter is free to pull forwardly from various angular positions and need not necessarily be extending straight forwardly from the actuator 10 to effectively move the plunger assembly 64 to its braking position. Accordingly, the friction shoe insures that effective emergency braking will be achieved even if the towing vehicle 12 is turning a sharp corner when the trailer 11 breaks away.

Figure 3:
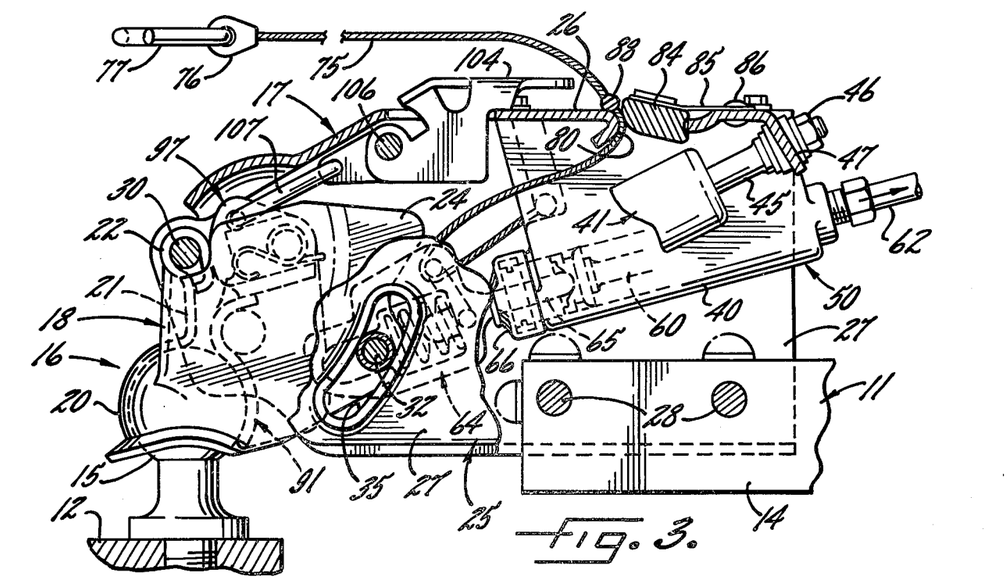
FIG. 3 is a side elevational view of the actuator and showing the actuator in a normal braking condition, parts of the actuator being broken away and shown in section.

As shown in FIG. 3, a bead 88 is secured to the cable 75 and engages the forward side of the friction shoe 84 when the cable is in its normal position. The bead serves as an indicator to inform the driver of the towing vehicle 12 if the cable has been inadvertently pulled to its emergency position. If the driver sees that the bead is located some distance forwardly of the shoe (see FIG. 6), the driver is warned that he should manually lift the shoe to enable the spring 61 to return the cable to its normal position and prevent the trailer brakes from dragging during normal towing.

In accordance with another feature of the invention, provision is made of a novel latching mechanism 90 (FIG. 7a) for coupling the socket 20 of the forward unit 16 to the hitch ball 15. The latching mechanism is self-locking, is manually operable from the rear unit 17 and yet permits the necessary pivotal movement between the rear unit and the forward unit 16.

The latching mechanism 90 includes a ball clamp 91 which serves to close the rear of the socket 20 and to lock the socket to the hitch ball 15. The ball clamp is in the form of an upright member and is defined by two laterally spaced side plates 92 (FIG. 8) which are located between the wings 24 of the head 18. A horizontal pin 94 spans the plates 92 at about their midpoints and is pivotally mounted by the wings 24. Formed integrally with the lower forward end portions of the plates is a clamping member 95 (FIG. 7a) whose forward side is curved generally in accordance with the curvature of the hitch ball 15. A lip 96 is formed on the upper end of the clamping member 95 and is hooked rearwardly around the pin 94.

The ball clamp 91 is adapted to swing about the pin 94 between a released position (FIG. 7a) in which the clamp permits the hitch ball 15 to enter the socket 20, and a locked position in which the clamp holds the ball in the socket. To keep the clamp 91 in its locked position, provision is made of a unique latch 97 which automatically prevents the clamp from moving to its released position once the ball has entered the socket. The latch herein is defined by a pair of laterally spaced ears 98 (FIG. 8) formed with convexly curved forward edges and mounted on a pivot pin 100 which spans the side plates 92 of the ball clamp 91. A torsion spring 101 surrounds the pin 100 and has one end hooked around one of the side plates 92. The other end of the spring 101 bears against a web 102 (FIG. 7a) formed integrally with and extending between the lower end portions of the ears 98 of the latch 97. Thus, the spring 101 urges the latch 97 in a counterclockwise direction about the pin 100.

Figures 7A, 7B:
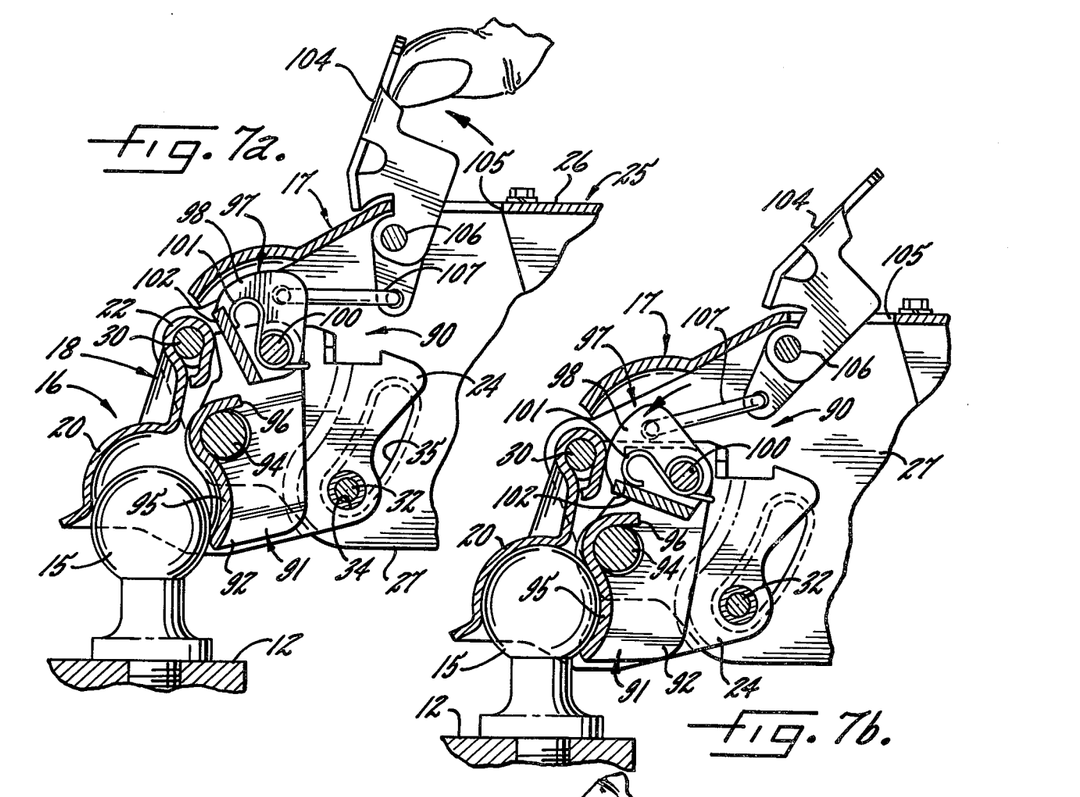
FIGS. 7a, 7b and 7c are cross-sectional views of the ball coupler and show the parts of the coupler in successive positions as the actuator is connected to the ball on the towing vehicle.
Figure 7C:
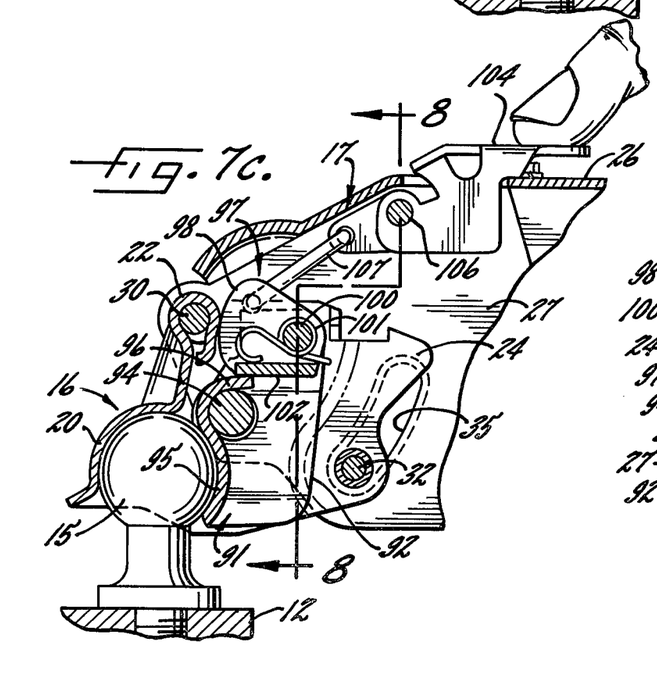
Figure 8:
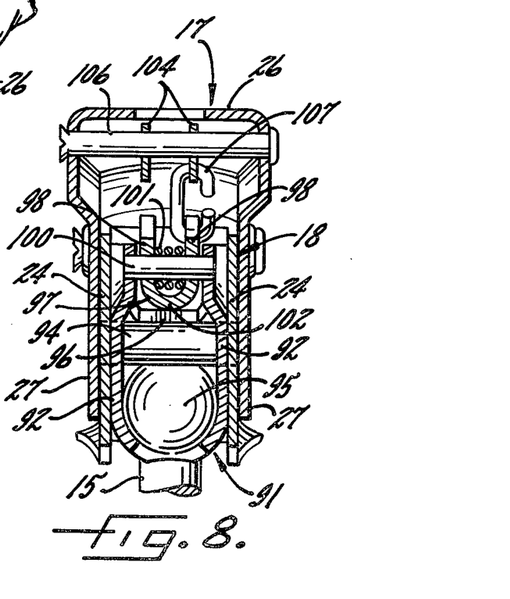
FIG. 8 is a fragmentary cross-section taken substantially along the line 8—8 of FIG. 7c.

In operation, the latch 97 moves from a released position shown in FIG. 7a, to an intermediately latched position shown in FIG. 7b and then to a fully latched position shown in FIG. 7c. To move the latch 97 between its fully latched position and its released position, a manually operable lever or handle 104 (FIG. 7a) is disposed within an opening 105 in the top wall 26 of the case 25 and is pivotally mounted between its ends on a pin 106 located within the case and extending between the side walls 27 thereof. The handle 104 is adapted to be moved manually from a locked position shown in FIG. 7c to a released position shown in FIG. 7a and is connected to the latch 97 by a link 107. The rear end of the link 107 is pivotally received in a hole in the handle 104 while the forward end of the link is pivotally received in a hole in one of the ears 98 of the latch 97.

To enable the socket 20 to be coupled to the hitch ball 15, the handle 104 is manually pivoted from its locked position (FIG. 7c) to its released position (FIG. 7a). When the handle is so pivoted, it acts through the link 107 to move the latch 97 from its fully latched position (FIG. 7c) to its released position (FIG. 7a). With the latch in its released position, the ball clamp 91 is free to swing rearwardly or counterclockwise about its mounting pin 94.

When the handle 104 is held in its released position, the tongue 14 of the trailer 11 is lowered toward the hitch ball 15. As the tongue is lowered, the lower end of the clamping member 95 of the ball clamp 91 engages the hitch ball 15 and causes the clamp to be cammed rearwardly or counterclockwise about the pin 94 so as to permit the ball to enter the socket 20. The handle 104 then may be released. With continued lowering of the tongue, the ball strikes the upper end portion of the clamping member 95 and cams the ball clamp in a forward or clockwise direction. As the ball clamp pivots clockwise, it swings the latch 97 rearwardly to its intermediately latched position (FIG. 7b) to cause the web 102 of the latch to move rearwardly past the curl 22. As the latch moves rearwardly, it also moves downwardly by virtue of its own weight and because of the bias applied by the torsion spring 101. The curved forward edges of the ears 98 of the latch 97 move into a position in which such edges engage the rear side of the curl 22 as shown in FIG. 7b. As a result, the latch wedges between the curl and the pivot pin 100 and prevents the ball clamp 91 from swinging counterclockwise about the pin 94 and releasing the ball 15. If the ball clamp attempts to swing counterclockwise, it merely wedges the latch 97 tighter. Thus, the latch will remain in its intermediately latched position and will hold the ball clamp even if the torsion spring 101 should happen to break. Also, the latch will hold the ball clamp 91 even if the driver forgets to move the handle 104 to its locked position and leaves the handle in the position shown in FIG. 7b. Thus, the latch makes the coupling arrangement self-locking.

Even more positive locking is effected when the driver moves the handle 104 to its locked position shown in FIG. 7c. As an incident thereto, the link 107 swings the latch 97 counterclockwise to its fully latched position (FIG. 7c) to cause the web 102 of the latch to positively engage the lip 96 of the ball clamp 91 and positively prevent the latter from swinging counterclockwise to its released position. As the latch moves to its fully latched position, the link 107 toggles overcenter in that the rear end of the link passes across the line extending between the forward end of the link and the pin 106. Thus, the link acts as a toggle to hold the latch 97 in its fully latched position and to hold the handle 104 in its locked position (see FIG. 7c).

It will be noted that the handle 104 is mounted on the rear unit 17 and is relatively far removed from the towing vehicle 12 and from the hitch ball 15. Thus, there is little danger of the driver striking the bumper of the towing vehicle and suffering a hand or knuckle injury when the driver manipulates the handle to couple or uncouple the trailer 11. Even though the handle is on the rear unit 17, the link 107 permits the front unit 16 to pivot or float freely relative to the rear unit and thus the handle does not interfere with the pivoting motion which the front and rear units undertake during braking.

We claim:

1. An assembly for hitching a trailer to a towing vehicle and for automatically actuating the hydraulic brakes of the trailer when the latter overruns the towing vehicle, said assembly comprising a forward unit adapted to be coupled removably to the towing vehicle, a rear unit interconnected with and movable generally fore-and-aft relative to said forward unit and adapted to be carried on the trailer, a master cylinder carried by said rear unit and operable when actuated to apply the brakes of the trailer, a plunger having a rear end portion telescoped into said master cylinder and operable to actuate said master cylinder when moved to a braking position, a plate on the forward end portion of said plunger and having a generally T-shaped opening formed therethrough with the cross bar and the stem of the T defining a rearward cage and a forward slot, respectively, a coil spring compressed between the front and rear sides of said cage, a laterally extending rod carried by said forward unit and received within said slot, said rod engaging the forward end of said spring and acting through said spring to move said plunger to said braking position when said rear unit moves forwardly relative to said forward unit.

2. An assembly as defined in claim 1 in which said rear unit comprises a case, and means attaching said master cylinder to said case and enabling selective fore-and-aft adjustment of said master cylinder relative to said case to permit said spring to be moved into engagement with said rod when said rear unit is located in a rearward position relative to said forward unit.

3. An assembly as defined in claim 2 in which said case is in the shape of an inverted U and includes a top wall, said master cylinder including a reservoir for pressure fluid, the top of said reservoir being open and being closed off by the top wall of said case.

4. An assembly as defined in claim 1 further including means connected to said plunger and adapted to be connected to the towing vehicle for moving said plunger to said braking position when the trailer breaks away from the towing vehicle, said slot being sufficiently long to permit said plunger to move to braking position during breakaway without causing movement of said rod.

5. An assembly for hitching a trailer to a towing vehicle and for automatically actuating the hydraulic brakes of the trailer when the latter overruns the towing vehicle, said assembly comprising a forward unit adapted to be coupled removably to the towing vehicle, a rear unit interconnected with and movable generally fore-and-aft relative to said forward unit and adapted to be carried on the trailer, said rear unit comprising a case of inverted U-shape cross-section, a master cylinder attached to the top wall of said case and operable to apply the brakes of the trailer when said rear unit moves forwardly relative to said forward unit, said master cylinder including a reservoir for pressure fluid, the top of said reservoir being open and being closed off by the top wall of said case.

6. An assembly for hitching a trailer to a towing vehicle and for automatically actuating the hydraulic brakes of the trailer when the latter either overruns or breaks away from the towing vehicle, said assembly comprising a forward unit adapted to be coupled removably to the towing vehicle, a rear unit interconnected with and movable generally fore-and-aft relative to said forward unit and adapted to be carried on the trailer, a master cylinder carried by said rear unit and operable when actuated to apply the brakes of the trailer, a plunger associated with said master cylinder and operable to actuate said master cylinder when moved to a braking position, said plunger being moved to said braking position in response to forward movement of said rear unit relative to said forward unit, a flexible breakaway cable connected to said plunger and adapted for connection to the towing vehicle, said cable being pulled in one direction to an emergency position and moving said plunger to said braking position when said trailer breaks away from said towing vehicle, means frictionally engaging said cable and permitting said cable to move in said one direction to said emergency position while frictionally restricting movement of said cable in the opposite direction away from said emergency position, said plunger including a rear end portion which is telescoped into said master cylinder, a plate on the forward end portion of said plunger and having an opening formed therethrough, a laterally extending rod carried by said forward unit and received within said opening, a coil spring engaging the rear side of said rod and compressed against the rear side of said opening, the forward side of said opening being spaced forwardly from the forward side of said rod when said plunger is in a non-braking position whereby said cable may move said plunger to said braking position without moving said rod.

7. An assembly for hitching a trailer to a towing vehicle and for automatically actuating the hydraulic brakes of the trailer when the latter either overruns or breaks away from the towing vehicle, said assembly comprising a forward unit adapted to be coupled removably to the towing vehicle, a rear unit interconnected with and movable generally fore-and-aft relative to said forward unit and adapted to be carried on the trailer, a master cylinder carried by said rear unit and operable when actuated to apply the brakes of the trailer, a plunger associated with said master cylinder and operable to actuate said master cylinder when moved to a braking position, said plunger being moved to said braking position in response to forward movement of said rear unit relative to said forward unit, a flexible breakaway cable connected to said plunger and adapted for connection to the towing vehicle, said cable being pulled in one direction to an emergency position and moving said plunger to said braking position when said trailer breaks away from said towing vehicle, and means frictionally engaging said cable and permitting said cable to move in said one direction to said emergency position while frictionally restricting movement of said cable in the opposite direction away from said emergency position, said rear unit comprising a case having a top wall with an opening therein, said cable being anchored against movement relative to said case at a location disposed rearwardly of the point of connection of said cable to said plunger and extending forwardly from said location, said cable then looping around said plunger and extending rearwardly from said point, extending upwardly through said opening and then extending forwardly to the towing vehicle, said frictionally engaging means comprising a shoe located at least partially within said opening, and a cantilevered leaf spring having a forward end portion secured to said shoe and having a rear end portion which is fixed to the top wall of said case at a location disposed rearwardly of said opening, said spring acting on said shoe and causing said shoe to press said cable into engagement with the forward wall of said opening.

* * * * *